(12) United States Patent
Johnen-Nelki

(10) Patent No.: US 11,524,615 B2
(45) Date of Patent: Dec. 13, 2022

(54) CENTER CONSOLE FOR A MOTOR VEHICLE

(71) Applicant: Ford Global Technologies, LLC, Dearborn, MI (US)

(72) Inventor: Nora Johnen-Nelki, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 17/307,268

(22) Filed: May 4, 2021

(65) Prior Publication Data
US 2021/0394657 A1 Dec. 23, 2021

(30) Foreign Application Priority Data

Jun. 17, 2020 (DE) .......................... 102020207456.9

(51) Int. Cl.
*B60N 2/75* (2018.01)

(52) U.S. Cl.
CPC ..................................... *B60N 2/793* (2018.02)

(58) Field of Classification Search
CPC .......... B60N 2/793; B60N 2/753; B60N 2/79; B60R 2011/0007; B60R 2011/0094; B60R 7/04; B60R 11/02
USPC .................................... 296/24.34, 37.8, 1.09
See application file for complete search history.

(56) References Cited

U.S. PATENT DOCUMENTS

| 5,372,403 | A | 12/1994 | Puerto | |
|---|---|---|---|---|
| 7,413,229 | B2 * | 8/2008 | Kukucka | B60N 2/793 |
| | | | | 296/1.09 |
| 2003/0155787 | A1 * | 8/2003 | Lein | B60N 2/793 |
| | | | | 296/24.34 |
| 2004/0217615 | A1 | 11/2004 | Lindstrom et al. | |
| 2007/0000959 | A1 * | 1/2007 | Perin | B60R 7/04 |
| | | | | 108/44 |
| 2007/0069544 | A1 * | 3/2007 | Sturt | B60R 7/04 |
| | | | | 296/37.8 |
| 2007/0176449 | A1 * | 8/2007 | Kukucka | B60N 2/793 |
| | | | | 296/24.34 |

FOREIGN PATENT DOCUMENTS

| DE | 19856978 A1 | 3/2000 |
|---|---|---|
| JP | 09267662 A | 10/1997 |

* cited by examiner

*Primary Examiner* — D Glenn Dayoan
*Assistant Examiner* — E Turner Hicks
(74) *Attorney, Agent, or Firm* — Vichit Chea; Price Heneveld LLP

(57) ABSTRACT

A center console for a motor vehicle, having a base portion and an armrest arranged on the base portion in a backrest position and which has a support face for an arm. In order to provide an adequate storage surface for the driver of a motor vehicle, there is provision for the armrest to have a pivot element which has an upper side which at least partially forms the support face in the backrest position and which can be pivoted forward with respect to the base portion about a front pivot axis which extends in the transverse vehicle direction into a storage position, in which a lower side of the pivot element forms a storage surface.

18 Claims, 4 Drawing Sheets

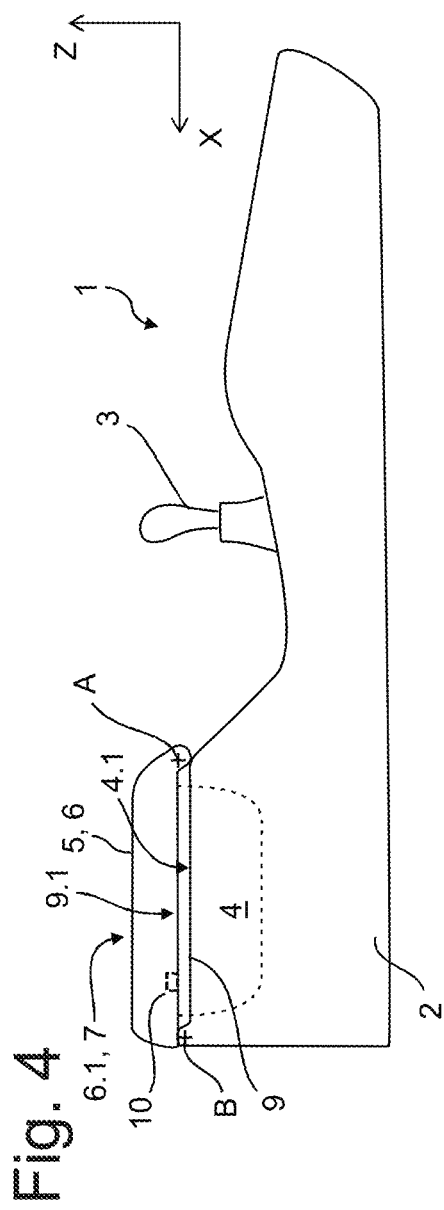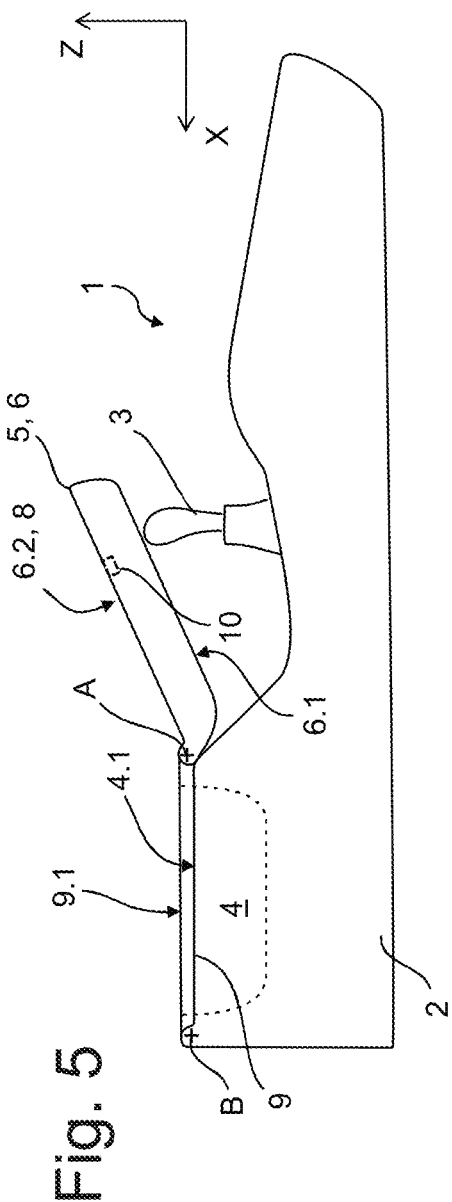

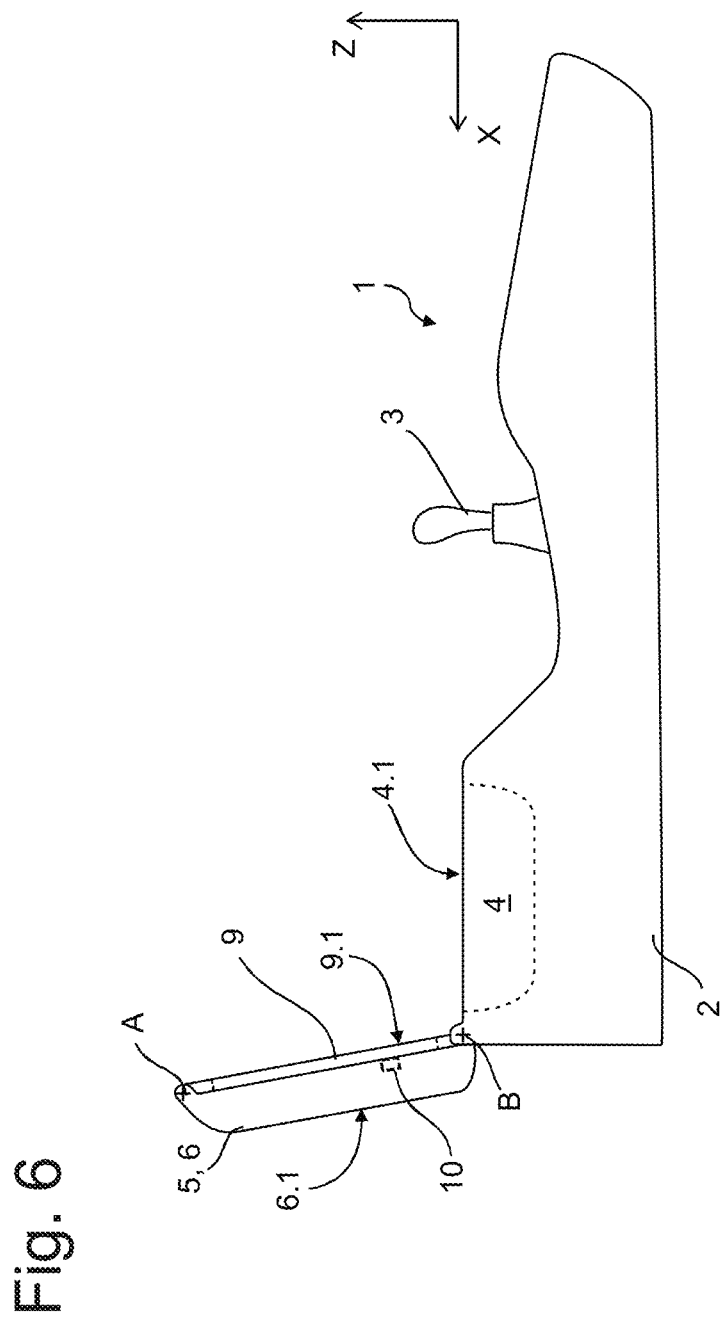

CENTER CONSOLE FOR A MOTOR VEHICLE

CROSS-REFERENCE TO RELATED APPLICATION

This application claims foreign priority benefits under 35 U.S.C. § 119(a)-(d) to German Application No. 102020207456.9 filed Jun. 17, 2020, which is hereby incorporated by reference in its entirety.

FIELD OF THE DISCLOSURE

The present disclosure generally relates to storage consoles, and more particularly relates to a center console for a motor vehicle.

BACKGROUND OF THE DISCLOSURE

In modern motor vehicles, such as, for example, passenger vehicles, there are varied storage possibilities available in the interior. Some storage possibilities are permanently available, such as, for example, storage compartments or cup holders in the doors or in the region of the center console. In contrast, other storage possibilities can be used temporarily as required, such as, for example, a cup holder in the flap of the glove compartment. While smaller storage surfaces (for example, for cups, keys or other small objects) can be readily provided in the region of all the seats of the motor vehicle, this is more difficult with larger storage surfaces, particularly when they are intended to be arranged in an ergonomically advantageous position for the user, that is to say, in such a manner that the user can use them comfortably from his/her seat. Such a storage surface can then also be used as a table-like support when eating, reading or also when working with a laptop or tablet computer. For passengers seated on a rear seat, such supports can be integrated, for example, in the backrest of the front seats. For passengers, there are, for example, solutions in which a foldable or extendable tray is integrated in the instrument panel. There may be a specific problem with the driver's seat since ergonomically ideal regions are taken up by the steering wheel, gear lever and various other operating elements. Nonetheless, an additional, in particular larger, support would also be advantageous for the driver, for example, in a conventional vehicle during a longer break or in an autonomous vehicle when it is in autonomous driving mode and the driver does not have to control the vehicle.

It would be desirable to provide an improved center console that offers adequate storage surface for the driver of a motor vehicle.

SUMMARY OF THE DISCLOSURE

According to a first aspect of the present disclosure, a center console for a motor vehicle is provided. The center console for a motor vehicle includes a base portion, and an armrest arranged on the base portion in a backrest position and having a support face for an arm, wherein the armrest has a pivot element having an upper side which at least partially forms the support face in the backrest position and which can be pivoted forward with respect to the base portion about a front pivot axis which extends in a transverse vehicle direction into a storage position, in which a lower side of the pivot element forms a storage surface.

According to a second aspect of the present disclosure, a center console for a motor vehicle is provided. The center console for a motor vehicle includes a base portion, at least one vehicle operating element arranged on the base portion, and an armrest arranged on the base portion in a backrest position and having a support face for an arm, wherein the armrest has a pivot element having an upper side which at least partially forms the support face in the backrest position and which can be pivoted forward with respect to the base portion about a front pivot axis which extends in a transverse vehicle direction into a storage position, in which a lower side of the pivot element forms a storage surface, wherein the pivot element in the storage position is arranged above at least one vehicle operating element, and wherein the pivot element is configured to be supported in the storage position at the lower side by the at least one operating element.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a side view of a second embodiment of a vehicle center console with a pivot element in a backrest position;

FIG. 5 is a side view corresponding to FIG. 4 with the pivot element illustrated in a storage position; and FIG. 6 is a side view corresponding to FIG. 4 with the pivot element illustrated in an open position.

DETAILED DESCRIPTION OF THE PREFERRED EMBODIMENTS

Figure 1:
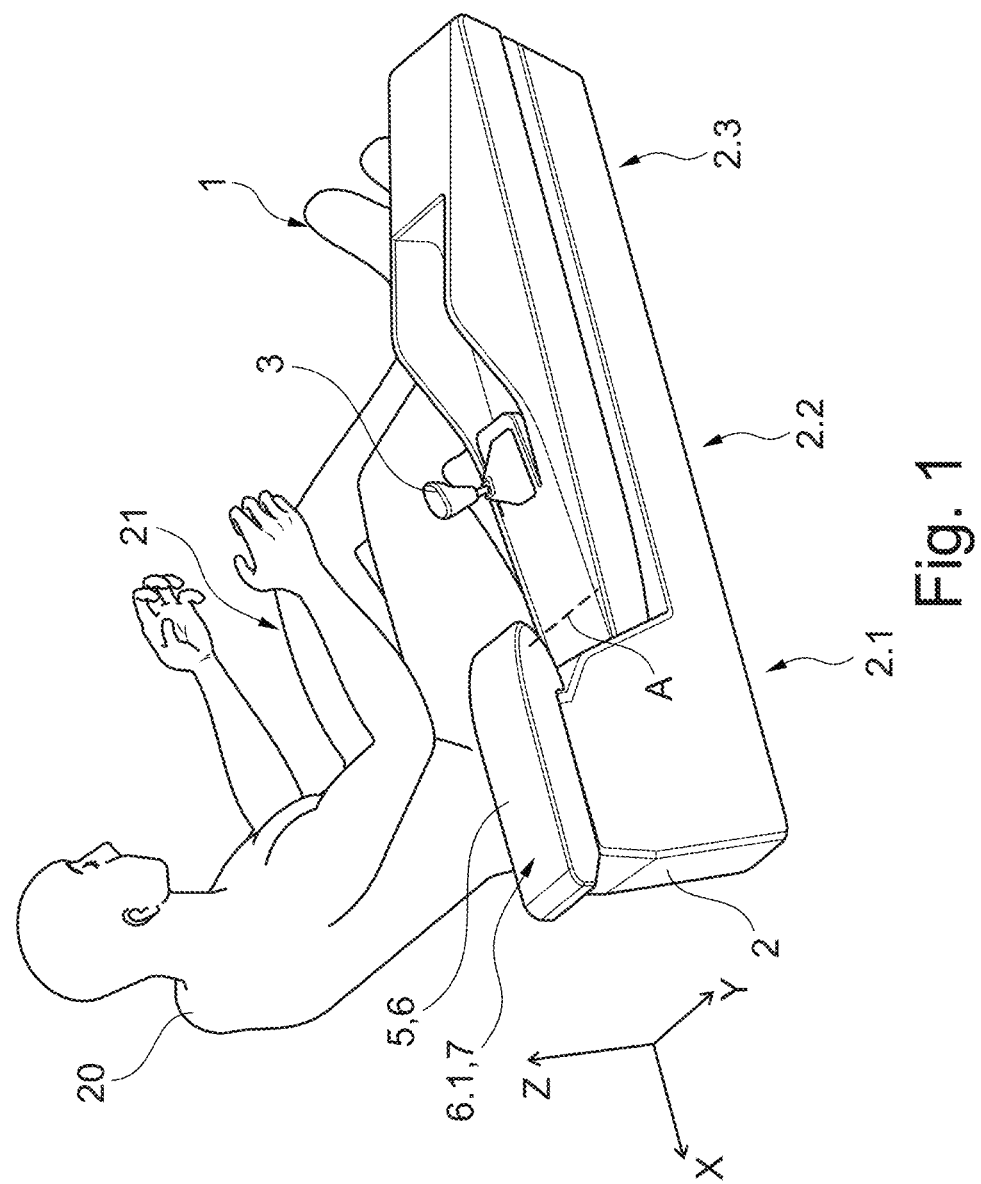
FIG. 1 is a perspective illustration of a first embodiment of a vehicle center console with a pivot element in a backrest position.

In the various figures, identical components are always given the same reference numerals, for which reason they are also only described once.

Figure 2:
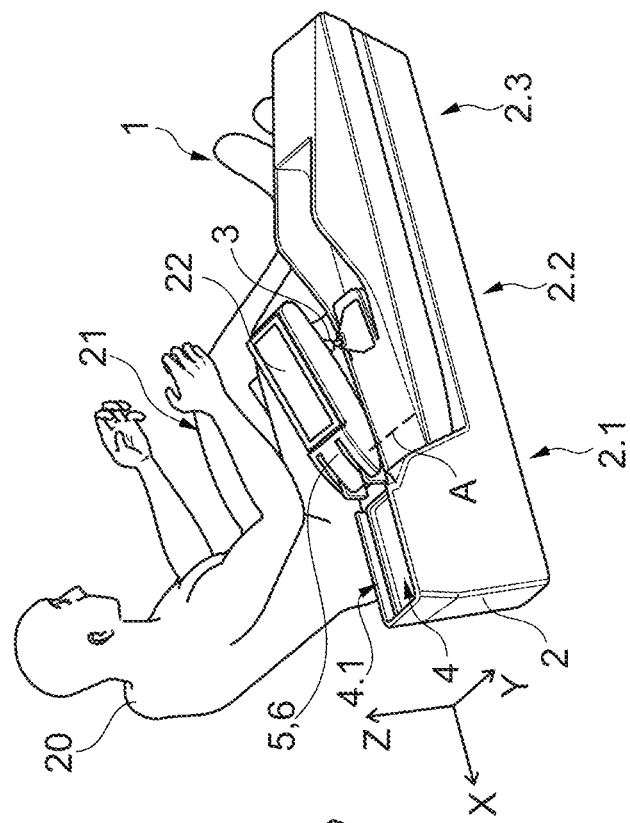
FIG. 2 is a perspective illustration corresponding to FIG. 1 with the pivot element in a storage position.
Figure 3:
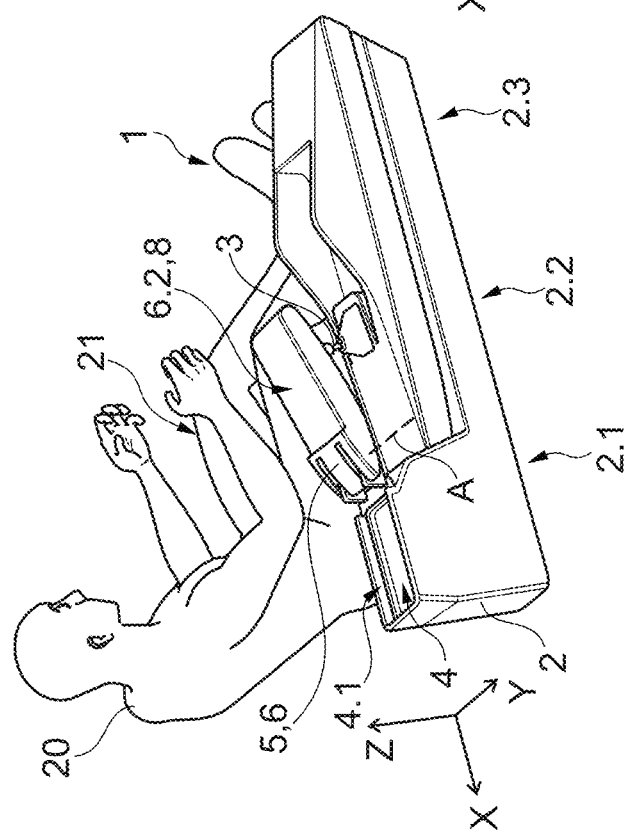
FIG. 3 is a perspective illustration corresponding to FIG. 2 with an object stored on the pivot element.

FIGS. 1-3 are perspective illustrations of a first embodiment of a center console 1 for a passenger motor vehicle and a driver 20 of the passenger motor vehicle. The center console 1 has a base portion 2 which extends along the X axis of the passenger vehicle from the region of an instrument panel (not illustrated here) up to the region between backrests of the driver's seat (also not illustrated) and the passenger seat. In a rear portion 2.1 in the longitudinal direction, the base portion 2 has an armrest 5. The armrest 5 is constructed as a pivot element 6 which is connected via a front pivot axis A to the base portion 2. The front pivot axis A extends parallel with the Y axis. In the backrest position illustrated in FIG. 1, the pivot element 6 is arranged on the base portion 2, wherein an upper side 6.1 of the pivot element 6 forms a support face 7 for an arm 21 of the driver 20. On the base portion 2, in a central portion 2.2, there is arranged a gear lever 3 which may, for example, be associated with a shift transmission of the passenger vehicle. While the pivot element 6 is in the backrest position, the gear lever 3 is freely accessible for the driver 20. A front portion 2.3 adjoins the instrument panel.

In a situation in which the driver 20 requires no access to the gear lever 3, for example, during a travel break or when the passenger vehicle is in an autonomous driving mode, the pivot element 6 can be pivoted forward about the front pivot axis A into a storage position which is illustrated in FIGS. 2 and 3. In this instance, the lower side 6.2 of the pivot element 6 opposite the upper side 6.1 forms a storage surface 8. The pivot element 6 is in this instance sized in such a manner that it rests on the gear lever 3 in the storage position and is supported at the lower side thereby. In this position, the storage surface 8 rises from the rear toward the front. It can now be used by the driver 20 or by a passenger (not illustrated in this instance) as a support for an object such as, for example, a tablet computer 22. The position in the region of the gear lever 3 is ergonomically optimal and enables problem-free manual access and a good view of the respective object. The described inclination of the storage surface 8 promotes optimal readability.

Furthermore, in the storage position, a storage compartment 4 which is formed within the base portion 2 is accessible via an upper access opening 4.1. In the backrest position, the pivot element 6 is arranged above the access opening 4.1 and conceals the access opening 4.1.

FIGS. 4-6 show a second embodiment of a center console 1 which substantially corresponds to the first embodiment and which same or similar features are not explained again in this regard. In this embodiment, however, the pivot element 6 is connected via an interposed connection element 9 to the base portion 2. More specifically, the pivot element 6 is connected via the front pivot axis A to the connection element 9, while the connection element 9 is itself connected to the base portion 2 via a rear pivot axis B. The rear pivot axis B also extends parallel with the Y axis. The connection element 9 is generally constructed in a frame-like manner and has a through-opening 9.1 whose dimensions substantially correspond to those of the access opening 4.1. FIG. 4 shows the backrest position in which the connection element 9 abuts the upper side of the base portion 2, while the pivot element 6 itself rests at the upper side on the connection element 9.

As a result of the pivoting about the front pivot axis A, the pivot element 6 can be adjusted into the storage position illustrated in FIG. 5, while the connection element 9 continues to remain stationary on the base portion 2. In this instance, the through-opening 9.1 is arranged above the access opening 4.1 so that the storage compartment 4 is accessible via the through-opening 9.1.

In a situation in which access to the storage compartment 4 is required, while at the same time the gear lever 3 (and where applicable other vehicle operating elements which are arranged on the base portion 2) must remain accessible, the pivot element 6 can be pivoted together with the connection element 9 in a backward direction about the rear pivot axis B, whereby it reaches the opening position illustrated in FIG. 6.

Since the opening position in this embodiment is unproblematic in so far as no operating elements can be concealed, free pivoting about the rear pivot axis B is possible. In the storage position, however, the pivot element 6 would as already discussed conceal the gear lever 3, for which reason it may be advantageous for a pivoting about the front pivot axis A not to be readily possible. To this end, a retention mechanism 10 which is not illustrated in greater detail in this instance may be provided between the pivot element 6 and the connection element 9. The retention mechanism 10 may be able to be released either only with a relatively great force being overcome or it may be coupled to an operating element via which the user can actively release the retention mechanism 10 when he/she decides to move the pivot element 6 into the storage position.

An improved center console for a motor vehicle is shown and described herein. Motor vehicles employing the center console may be passenger vehicles including lorries. In particular, it may also be a motor vehicle which has an optional autonomous driving mode. In the assembled state, the center console is arranged in the region of the front seats of the motor vehicle, more specifically between the driver's seat and the passenger seat. At the front in the travel direction, the center console may adjoin an instrument panel of the motor vehicle or merge into it. It normally comprises a plurality of individual elements which are connected to each other and may optionally also have elements which can sometimes also be associated with other components of the vehicle, for example, a trim element which may be associated partially with the center console and partially with the instrument panel. In the assembled state, the center console generally has a gear lever can be used to select either in the case of a shift transmission a gear or in the case of an automatic gearbox a travel stage. Additionally or alternatively, other operating elements may also be arranged on the center console. However, the gear lever is not a compulsory component of the center console.

The center console has a base portion and an armrest which is arranged on the base portion in a backrest position and which has a support face for an arm. The base portion normally forms the main portion of the center console and is generally connected in a manner fixed in position to the remaining interior of the vehicle. The base portion may have one or more trim elements which protect internal elements from dirt and damage and may, for example, prevent internal electrical components from constituting a safety risk for the occupants of the vehicle. Furthermore, each trim element may also fulfill an optical/aesthetic and haptic function. Within the vehicle, the base portion may extend in the longitudinal direction, for example, from a position between the backrests of the front seats up to a position adjacent to the instrument panel. In a position which is referred to in this instance as the "backrest position," the armrest is arranged on the base portion, it could also be said, with respect to the correctly installed state, the armrest is arranged on an upper side of the base portion. The armrest has a support face for an arm, that is to say, a support face which is correctly provided so that the driver or the passenger can rest an arm (or part of an arm) thereon. The armrest may be upholstered in the region of the support face and may have a surface material which ensures a desired visual appearance or feel, for example, a material which corresponds to the surface material of the vehicle seats. Normally, the armrest or the support face is in the backrest position orientated at least substantially in a horizontal manner.

The armrest has a pivot element which has an upper side which at least partially forms the support face in the backrest position and which can be pivoted forward with respect to the base portion about a front pivot axis which extends in the transverse vehicle direction into a storage position, in which a lower side of the pivot element forms a storage surface. The upper side of the pivot element is the side which is arranged at the upper side in the backrest position. Alternatively, it would also be possible to refer to a "first side." This upper side forms in the backrest position at least partially the above-mentioned support face, that is to say, the support face is at least partially formed by the upper side of the pivot element. Accordingly, the upper side may have an upholstery and/or a surface material, as explained above with reference to the support face.

In one embodiment, the pivot element is not rigidly connected to the base portion, but instead can be pivoted about a front pivot axis with respect to the base portion. The front pivot axis may in this embodiment connect the pivot element and the base portion directly or the front pivot axis may form a connection between the pivot element or base portion and an interposed additional element, as will be further explained below. The front pivot axis extends in the transverse vehicle direction, that is to say, in the Y direction or parallel with the Y axis. Accordingly, the associated pivot movement extends within the X-Z plane. The term "front pivot axis" normally means that the corresponding pivot axis with respect to the backrest position in the longitudinal vehicle direction is arranged at the height of a front region of the pivot element or in this front region. In particular, a rear pivot axis mentioned below, if provided, may be arranged with respect to the longitudinal vehicle direction behind the front pivot axis when the pivot element is in the backrest position.

As a result of the pivot movement, the pivot element can be pivoted from the backrest position forward into a storage position. In this storage position, the lower side which is of course opposite the upper side forms a storage surface. The lower side could also be referred to as the "second side." One or more objects can be placed on the storage surface. The lower side is arranged at the lower side in the backrest position and is not accessible. As a result of pivoting into the storage position, the lower side becomes accessible and can, depending on the embodiment, be arranged partially or completely above the upper side. In order to perform its function, the storage surface in the storage position is at least partially inclined by less than 90°, typically less than 70°, with respect to the horizontal plane (X-Y plane). Depending on the embodiment, it may at least partially horizontally or substantially horizontally (for example, at an angle less than 30° or less than 20° with respect to a horizontal defined by the X-Y plane of the motor vehicle), wherein, however, paths which also deviate significantly from the horizontal may be advantageous, for example, a type of bead or flange could be formed at the edge side and prevents objects from rolling down or sliding down. A recess which acts as a cup holder could, for example, also be formed. Optionally, the lower side of the pivot element could also have a display element, such as a screen, or an operating element, such as a keyboard or a touchscreen. These elements may be arranged on or beside the storage surface.

Although "a" storage position or "the" storage position is referred to in this instance, it is possible in the context of the disclosure for the pivot element to be able to be arranged in a plurality of storage positions which all, however, originate from a forward-extending pivot movement from the backrest position. The various storage positions correspond in this instance to different pivot angles.

As a result of the disclosure, there is provided for the driver and/or passenger a storage surface in a region which is ergonomically optimal. Both from the driver's seat and from the passenger seat, the region can be reached without changing the seat position manually and can be clearly seen. At the same time, an element which is in any case present in many vehicles, that is to say, the armrest or a portion thereof, is used to provide this storage surface. In order to perform its function in the backrest position, the pivot element normally has a comparatively high level of stability, which can also advantageously be used in the storage position. In contrast to tray or table elements which can be extended or folded out and which are known from the prior art, the center console can be implemented using a comparatively simple mechanism, that is to say, such that the armrest has, instead of a fixed connection to the base portion, a pivotable connection via the front pivot axis.

According to an embodiment, the pivot element forms part of the armrest, normally a front portion of the armrest. In particular, however, the armrest may be formed completely by the pivot element, that is to say, the armrest and pivot element are identical or the armrest forms a portion of the pivot element. In this manner, the maximum achievable size of the pivot element is normally used so that the storage surface is also maximized.

According to an embodiment, the pivot element can be supported in the storage position in such a manner that the storage surface is inclined at least predominantly forward in an upward direction. That is to say, the pivot element can be secured by use of a supporting force or a supporting torque with respect to the front pivot axis in a storage position in which the storage surface is at least predominantly inclined, more specifically is inclined in the travel direction from the rear to the front in an upward direction. As a result of such an inclination, for example, an ergonomically advantageous shelf for a book, a tablet computer or the like can be provided.

According to an embodiment, the pivot element in the storage position is arranged above at least one operating element which is arranged on the center console. Such operating elements are normally accessible for the driver, while he/she controls or drives the vehicle. In contrast, the accessibility of the operating elements in a conventional vehicle may be able to be dispensed with during a longer break or with an autonomous vehicle if it is in the autonomous mode and the driver does not have to control the vehicle. For these cases, it can be accepted that one or more operating elements are arranged below the pivot element and are consequently concealed, while at the same time an arrangement of the storage space in an ergonomically advantageous position is achieved. The operating element may, for example, be a rotary control or a slide control, a lever, a button or also a sensor field.

In particular, the pivot element may be arranged above a gear lever in the storage position. The gear lever may be a gear selection lever or a shift transmission or a lever, via which the travel mode in an automatic gearbox is selected. According to a typical arrangement, such a switch lever is arranged at an upper side of the base portion or protrudes from this upper side in an upward direction. Structurally, the position of the gear lever corresponds to a region which can be readily reached in an ergonomic manner for the driver and which is therefore also suitable for the arrangement of the storage surface.

In a particular embodiment, the pivot element can be supported in the storage position at the lower side by the operating element. That is to say, the pivot element may, normally with the upper side thereof, abut the operating element so that it is supported thereon. In particular, the pivot element may be supported on a gear lever which protrudes upward from the base portion. This embodiment contributes significantly to stabilizing the pivot element without an individual support mechanism having to be provided for this purpose so that material and weight are saved. On the other hand, the mechanical loading of the operating element which may be anticipated as a result of the pivot element (and objects which are arranged thereon) is so small that it can readily withstand this. As long as the contact by the pivot element could initiate the corresponding operating element, it is possible to provide a temporary deactivation of the operating element. This may, for example, be carried out automatically in an autonomous driving mode. It would also be conceivable to provide a sensor or a switch which in the event of a pivot movement of the pivot element automatically deactivates the operating element.

Advantageously, the base portion has a storage compartment having an upper access opening which in the backrest position is arranged at least partially below the pivot element. Consequently, in the backrest position, the access to the upper access opening is at least partially blocked by the pivot element. In particular, the pivot element may form a lid or a cover for the storage compartment. Normally, the access opening is released by the pivot movement of the pivot element so that it is accessible in the storage position.

According to an embodiment, the pivot element is directly connected to the base portion by use of the front pivot axis. Together with the embodiments described above, access to the storage compartment is only possible when the pivot element is arranged in the storage position. However, this may be disadvantageous during normal, non-autonomous driving operation since the pivot element as mentioned above can conceal operating elements which have to be accessible for the driver. According to one embodiment, a connection element is pivotably connected via the front pivot axis and a rear pivot axis which extends in the transverse vehicle direction, on the one hand, to the pivot element and, on the other hand, to the base portion, whereby the pivot element can be pivoted backward into an open position. The corresponding connection element is interposed between the base portion and the pivot element, that is to say, it connects the pivot element to the base portion. One of the connections is provided by the front pivot axis, while the other connection is provided by a rear pivot axis which also extends in a transverse vehicle direction (Y direction). In this instance, two different embodiments are conceivable. According to a first embodiment, the connection element is connected via the rear pivot axis to the base portion and via the front pivot axis to the pivot element. According to a second embodiment, the connection element is connected via the front pivot axis to the base portion and via the rear pivot axis to the pivot element. In the first instance, the pivot element can be pivoted into the storage position, while the connection element remains stationary on the base portion. In the second case, the pivot element can be pivoted together with the connection element into the storage position. In both cases, the pivot element can be pivoted about the rear pivot axis backward into an open position, in the first case together with the connection element and, in the second case, alone, wherein the connection element remains stationary on the base portion.

In order, in the cases in which the connection element remains stationary on the base portion, while the pivot element is pivoted alone into the storage position or into the open position, to afford access to the storage compartment, there is provision in another embodiment for the connection element to have a through-opening which in the storage position or in the open position is arranged above the access opening, whereby the storage compartment is accessible through the through-opening. The connection element may in this instance be in the form of a frame which surrounds the through-opening. At opposing ends of the frame, the front and the rear pivot axis are constructed. The dimensions of the through-opening may be identical to those of the access opening, but the through-opening could also be constructed to be smaller or larger.

In a particular embodiment with a front and a rear pivot axis, it may be advantageous for the pivoting into the storage position not to be readily possible as long as operating elements could be concealed. For this reason, the center console may have a retention mechanism which prevents pivoting into the storage position and which can be unlocked in order to enable pivoting into the storage position. In contrast, the retention mechanism has no influence on the pivotability into the open position, that is to say, it can be readily assumed at any time since in this instance there is no risk of the operating elements being concealed. The retention mechanism may, for example, produce a positive-locking connection between the two elements which can be pivoted relative to each other about the front pivot axis. The corresponding positive-locking connection can then be released either by overcoming a resilient force or by the user activating an operating element if in fact a displacement into the storage position is not hazardous. In addition to a positive-locking connection, however, a non-positive-locking connection or a magnetic coupling which can be overcome only under a relatively significant application of force could also be provided.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A center console for a motor vehicle, the center console comprising:
    a base portion; and
    an armrest arranged on the base portion in a backrest position and having a support face for an arm, wherein the armrest has a pivot element having an upper side which at least partially forms the support face in the backrest position and which can be pivoted forward with respect to the base portion about a front pivot axis which extends in a transverse vehicle direction into a storage position, in which a lower side of the pivot element forms a storage surface, wherein the armrest is formed completely by the pivot element.

2. The center console according to claim 1, wherein the pivot element is configured to be supported in the storage position such that the storage surface is inclined at least predominantly forward in an upward direction.

3. The center console according to claim 1, wherein the pivot element in the storage position is arranged above at least one operating element which is arranged on the center console.

4. The center console according to claim 3, wherein the pivot element is arranged above a gear lever in the storage position.

5. The center console according to claim 4, wherein the pivot element is configured to be supported in the storage position at the lower side by the operating element.

6. The center console according to claim 1, wherein the base portion has a storage compartment having an upper access opening which in the backrest position is arranged at least partially below the pivot element.

7. The center console according to claim 1, further comprising a connection element pivotably connected via the front pivot axis and a rear pivot axis which extends in a transverse vehicle direction to the pivot element and to the base portion, wherein the pivot element can be pivoted backward into an open position.

8. The center console according to claim 7, wherein the connection element has a through-opening which in the storage position or in the open position is arranged above the access opening, wherein the storage compartment is accessible through the through-opening.

9. The center console according to claim 1, further comprising a retention mechanism which prevents pivoting into the storage position and which can be unlocked to enable pivoting into the storage position.

10. A center console for a motor vehicle, the center console comprising:
a base portion;
at least one vehicle operating element arranged on the base portion; and
an armrest arranged on the base portion in a backrest position and having a support face for an arm, wherein the armrest has a pivot element having an upper side which at least partially forms the support face in the backrest position and which can be pivoted forward with respect to the base portion about a front pivot axis which extends in a transverse vehicle direction into a storage position, in which a lower side of the pivot element forms a storage surface, wherein the pivot element in the storage position is arranged above at least one vehicle operating element, and wherein the pivot element is configured to be supported in the storage position at the lower side by the at least one operating element.

11. The center console according to claim 10, wherein the armrest is formed completely by the pivot element.

12. The center console according to claim 10, wherein the pivot element is configured to be supported in the storage position such that the storage surface is inclined at least predominantly forward in an upward direction.

13. The center console according to claim 10, wherein the at least one vehicle operating element comprises a gear lever.

14. The center console according to claim 10, wherein the base portion has a storage compartment having an upper access opening which in the backrest position is arranged at least partially below the pivot element.

15. The center console according to claim 10, further comprising a connection element pivotably connected via the front pivot axis and a rear pivot axis which extends in a transverse vehicle direction to the pivot element and to the base portion, wherein the pivot element can be pivoted backward into an open position.

16. The center console according to claim 15, wherein the connection element has a through-opening which in the storage position or in the open position is arranged above the access opening, wherein the storage compartment is accessible through the through-opening.

17. The center console according to claim 10, further comprising a retention mechanism which prevents pivoting into the storage position and which can be unlocked to enable pivoting into the storage position.

18. A center console for a motor vehicle, the center console comprising:
a base portion; and
an armrest arranged on the base portion in a backrest position and having a support face for an arm, wherein the armrest has a pivot element having an upper side which at least partially forms the support face in the backrest position and which can be pivoted forward with respect to the base portion about a front pivot axis which extends in a transverse vehicle direction into a storage position, in which a lower side of the pivot element forms a storage surface, wherein the pivot element in the storage position is arranged above at least one operating element which is arranged on the center console, wherein the pivot element is arranged above a gear lever in the storage position, and wherein the pivot element is configured to be supported in the storage position at the lower side by the operating element.

* * * * *